(12) United States Patent
Loo et al.

(10) Patent No.: US 9,521,481 B2
(45) Date of Patent: *Dec. 13, 2016

(54) SPEAKER PORTING AROUND BACKLIT KEYBOARD

(71) Applicant: Google Inc., Mountain View, CA (US)

(72) Inventors: Kenneth Ryan Loo, San Jose, CA (US); Leng Ooi, San Jose, CA (US)

(73) Assignee: Google Inc., Mountain View, CA (US)

(*) Notice: Subject to any disclaimer, the term of this patent is extended or adjusted under 35 U.S.C. 154(b) by 21 days.

This patent is subject to a terminal disclaimer.

(21) Appl. No.: 14/641,239

(22) Filed: Mar. 6, 2015

(65) Prior Publication Data
US 2015/0181327 A1    Jun. 25, 2015

Related U.S. Application Data

(63) Continuation of application No. 13/473,514, filed on May 16, 2012, now Pat. No. 8,976,992.

(51) Int. Cl.
H04R 9/06 (2006.01)
H04R 1/28 (2006.01)
H04R 1/02 (2006.01)
G06F 3/02 (2006.01)

(52) U.S. Cl.
CPC ............. *H04R 1/2857* (2013.01); *G06F 3/021* (2013.01); *H04R 1/02* (2013.01); *H04R 2499/15* (2013.01)

(58) Field of Classification Search
CPC ............. H04R 1/02; H04R 1/08; H04R 1/021; H04R 1/025; H04R 1/026; H04R 1/028; H04R 5/02; H04R 5/023; H04R 2201/021; H04R 2201/023; H04R 2205/021; H04R 2499/11; H04R 2499/15; H04R 1/2857; G06F 3/021
USPC ......... 381/87, 300, 301, 302, 306, 333, 334, 381/386, 388
See application file for complete search history.

(56) References Cited

U.S. PATENT DOCUMENTS

| 5,610,992 A | 3/1997 | Hickman |
| 5,646,820 A | 7/1997 | Honda et al. |
| 5,668,882 A | 9/1997 | Hickman et al. |
| 5,682,290 A | 10/1997 | Markow et al. |
| 5,761,322 A | 6/1998 | Illingworth et al. |
| 5,796,854 A | 8/1998 | Markow |
| 5,805,708 A | 9/1998 | Freadman |
| 5,838,537 A | 11/1998 | Lundgren et al. |
| 6,590,508 B1 * | 7/2003 | Howell ................ G06F 3/0202 200/314 |

(Continued)

Primary Examiner — Brian Ensey
(74) Attorney, Agent, or Firm — McDermott Will & Emery LLP

(57) ABSTRACT

A system for porting a speaker through a keyboard module and a backlight module is provided. The system includes an enclosure, the enclosure configured to mount the keyboard module, the backlight module, and the speaker thereto, wherein the speaker is disposed under a portion of the keyboard module and the backlight module. The system also includes a port path for porting the speaker through the keyboard module and the backlight module, the port path extending from the speaker to an outer surface of the keyboard module, wherein a first portion of the port path includes a passage in the enclosure, the passage disposed adjacent to an edge of the keyboard module and the backlight module, and wherein a second portion of the port path includes a periphery of a key of the keyboard module.

20 Claims, 4 Drawing Sheets

(56) References Cited

U.S. PATENT DOCUMENTS

| | | | |
|---|---|---|---|
| 6,697,495 B1 | 2/2004 | Youn | |
| 7,173,814 B2 | 2/2007 | Cohen et al. | |
| 7,327,560 B1 | 2/2008 | Tabasso et al. | |
| 7,643,643 B2 | 1/2010 | Miyamoto | |
| 8,000,098 B1 | 8/2011 | Sinha | |
| 8,170,266 B2 | 5/2012 | Hopkinson et al. | |
| 2003/0223610 A1* | 12/2003 | Tanemura | H04R 1/00 381/334 |
| 2005/0130716 A1 | 6/2005 | Shin et al. | |
| 2006/0067557 A1 | 3/2006 | Imamura | |
| 2009/0112339 A1 | 4/2009 | Huang et al. | |
| 2012/0087535 A1 | 4/2012 | Tanaka | |

\* cited by examiner

SPEAKER PORTING AROUND BACKLIT KEYBOARD

CROSS-REFERENCE TO RELATED APPLICATION

The present application is a continuation application of U.S. patent application Ser. No. 13/473,514 entitled "SPEAKER PORTING AROUND BACKLIT KEYBOARD," issued as U.S. Pat. No. 8,976,992, filed on May 16, 2012, the contents of which are hereby incorporated by reference in their entirety for all purposes.

FIELD

The present disclosure generally relates to speaker porting and, in particular, relates to speaker porting around a backlit keyboard.

BACKGROUND

A device, such as a portable computer or laptop, may include a speaker. The speaker may be disposed adjacent to a display or a keyboard. The speaker may require porting in order to allow the sound generated by the speaker to reach the user. Without porting, the speaker sound may be muffled. Generally, porting of the speaker may require large holes or speaker grills disposed on a case or enclosure of the device.

SUMMARY

The disclosed subject matter relates to a system for porting a speaker through a keyboard module and a backlight module. The system comprises an enclosure, the enclosure configured to mount the keyboard module, the backlight module, and the speaker thereto, wherein the speaker is disposed under a portion of the keyboard module and the backlight module. The system further comprises a port path for porting the speaker through the keyboard module and the backlight module, the port path extending from the speaker to an outer surface of the keyboard module, wherein a first portion of the port path comprises a passage in the enclosure, the passage disposed adjacent to an edge of the keyboard module and the backlight module, and wherein a second portion of the port path comprises a periphery of a key of the keyboard module.

The disclosed subject matter further relates to a method for porting a speaker through a keyboard module and a backlight module. The method comprises disposing the speaker within an enclosure under a portion of the keyboard module and the backlight module. The method further comprises porting the speaker through the keyboard module and the backlight module using a port path, the port path extending from the speaker to an outer surface of the keyboard module, the port path comprising a first portion and a second portion, wherein the first portion comprises a passage in the enclosure, the passage disposed adjacent to an edge of the keyboard module and the backlight module, and wherein the second portion comprises a periphery of a key of the keyboard module.

The disclosed subject matter further relates to a system for porting a speaker through a keyboard module and a backlight module. The system comprises an enclosure, the enclosure configured to mount the keyboard module, the backlight module, and the speaker thereto, wherein the speaker is disposed underneath a portion of the keyboard module and the backlight module. The system further comprises a port path for porting the speaker, the port path having a proximal end at the speaker and a distal end at an outer surface of the keyboard module, wherein a proximal portion of the port path comprises a portion of the enclosure adjacent to an edge of the keyboard module and the backlight module, and wherein a distal portion of the port path comprises a periphery of a key of the keyboard module.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

A device, such as a portable computer or laptop, may include a speaker disposed adjacent to a display or a keyboard. The speaker may require porting to allow the sound created by the speaker to reach a user of the device. Without porting, the speaker sound may be muffled. Generally, porting of the speaker is provided by large holes or speaker grills disposed on the case or enclosure of the device. One method for eliminating the large holes or speaker grills from the case or enclosure may include disposing the speaker under the keyboard. In this example, the speaker may be ported through one or more keys of the keyboard.

For a backlit keyboard, porting through the one or more keys of the backlit keyboard may require large holes through a backlight module. However, this may be undesirable since the large holes may cause substantial losses in illumination and therefore product performance.

According to various aspects of the subject technology, a port path for porting a speaker that is mounted under a backlit keyboard is provided. The port path may be configured to provide a path through the backlit keyboard without substantially reducing the illumination of a backlight module.

Figure 1:
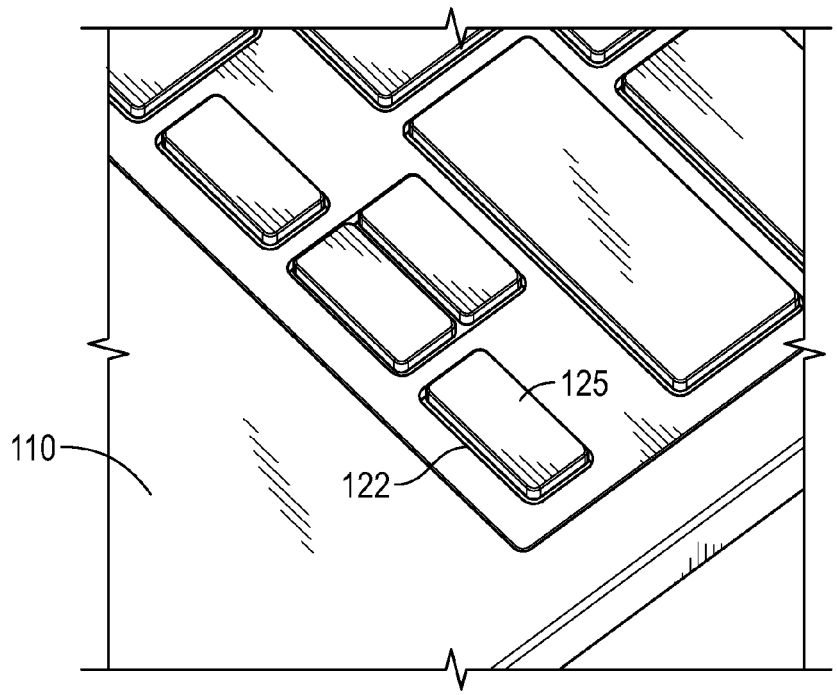
FIG. 1 illustrates an example of a system for porting a speaker through a keyboard module and a backlight module.
Figure 2:
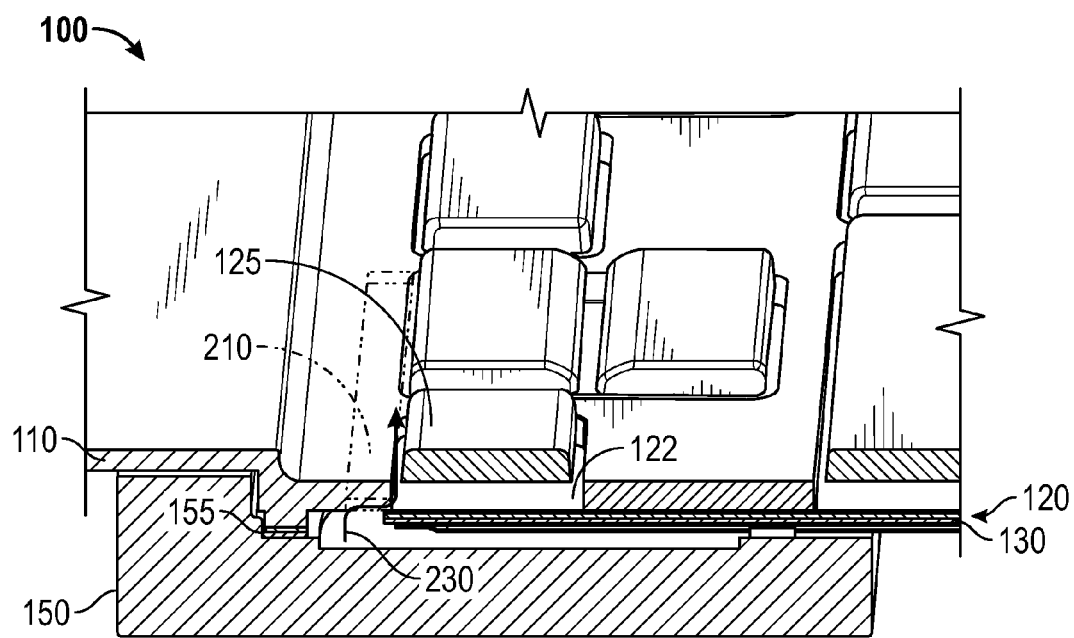
FIG. 2 is a perspective cross section view of an example system for porting a speaker through a keyboard module and a backlight module.

FIGS. 1 and 2 illustrate an example of a system 100 for porting a speaker through a keyboard module 120 and a backlight module 130. In some aspects, a device may include an enclosure 110 configured to mount the keyboard module 120, backlight module 130, and speaker 150 thereto. The enclosure 110 may be formed from a metal alloy, plastic, resin, or other materials suitable for mounting components thereto.

The speaker 150 may be mounted within the device, under a portion of the keyboard module 120 and the backlight module 130. The speaker 150 may be mounted directly to the enclosure 110 by mechanical or adhesive means. A speaker seal 155 may be used to create a sealed interface between the speaker 150 and the enclosure 110.

The keyboard module 120 may include a plurality of keys disposed on a plate, configured to facilitate typing of letters and characters into the device. The keyboard module 120 may be disposed on the backlight module 130. The keyboard module 120 and the backlight module 130 may be directly mounted to the enclosure 110 via mechanical or adhesive means. The enclosure 110 may include openings 250 (shown in FIG. 5) corresponding to the keys or keycaps 125 of the keyboard module 120. In some aspects, a gap 122 may be formed between the enclosure openings 250 and the keys 125.

The backlight module 130 may include a light source disposed in a light guiding plate. The light source may be configured to emit light to the light guiding plate. A reflective component may be disposed under the light guiding plate to reflect the light emitted through the light guiding plate toward the keyboard module 120. The light emitted by the light source is therefore directed through the light guiding plate into a predetermined position of the keyboard module 120, such as a transparent area on a key or keycap, so that a user can see light projecting from the backlit keyboard.

In some aspects, the system 100 includes a port path 230 for porting the speaker 150 through the keyboard module 120 and the backlight module 130. The port path 230 may extend from the speaker 150 to an outer surface of the keyboard module 120.

Referring to FIG. 2, the port path 230 may include a portion of the enclosure 110, backlight module 130, and keyboard module 120. Specifically, a first portion of the port path 230 may extend from the speaker 150 to the enclosure 110, and a second portion of the port path 230 may extend from the enclosure 110 to a periphery of a key 125 of the keyboard module 120.

Figure 5:
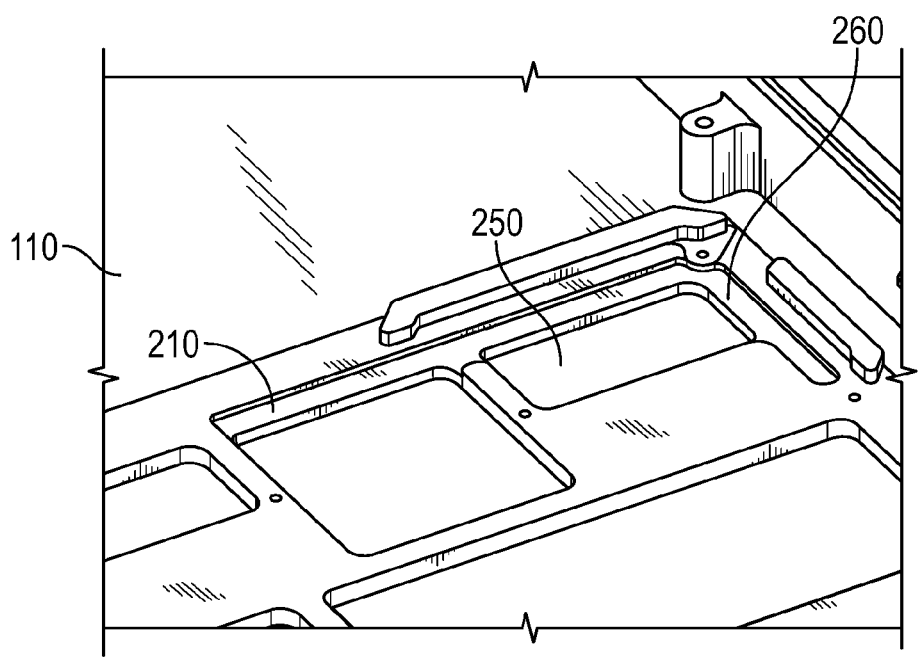
FIG. 5 illustrates an example enclosure.

FIG. 5 illustrates an underside view of the enclosure 110. The first portion of the port path 230 may include a passage 210 in the enclosure 110. The passage 210 may include an area of the enclosure 110 having a reduced thickness in comparison to the surrounding area of the enclosure 110. The passage 210 may be created by removing material from the enclosure 110 using suitable manufacturing and fabrication methods and procedures, including but not limited to milling, drilling, boring, or casting. The passage 210 may be disposed proximal to the speaker 150 to facilitate transmission of sound waves generated by the speaker 150 to the user. The passage 210 may be disposed adjacent to an edge of the keyboard module 120 and the backlight module 130 (as shown in FIG. 2). By disposing the passage 210 adjacent to the edge of the keyboard module 120 and backlight module 130, the speaker 150 may be ported through the keyboard module 120 and backlight module 130 without requiring visible holes or grills on the outer surface of the device and without substantially reducing the illumination of the backlight module 130.

In another aspect, the first portion of the port path 230 may include a second passage 260 in the enclosure 110. The passage 210 and the second passage 260 may have different sizes. For example, the passage 210 may be longer than the second passage 260, as shown in FIG. 5. In another example, the second passage may have a different depth or width than the passage 210. The second passage 260 may include an area of the enclosure 110 having a reduced thickness in comparison to the surrounding area of the enclosure 110, similarly to the passage 210. The second passage 260 may be disposed adjacent to a second edge of the keyboard module 120 and the backlight module 130, and be disposed proximal to the speaker 150. The second passage 260 may therefore facilitate transmission of sound waves generated by the speaker 150 to the user by providing the sound waves an additional path to travel through. By disposing the second passage 260 adjacent to the second edge of the keyboard module 120 and backlight module 130, the speaker 150 may be ported through the keyboard module 120 and backlight module 130 without requiring visible holes or grills on the outer surface of the device and without substantially reducing the illumination of the backlight module 130.

Figure 3:
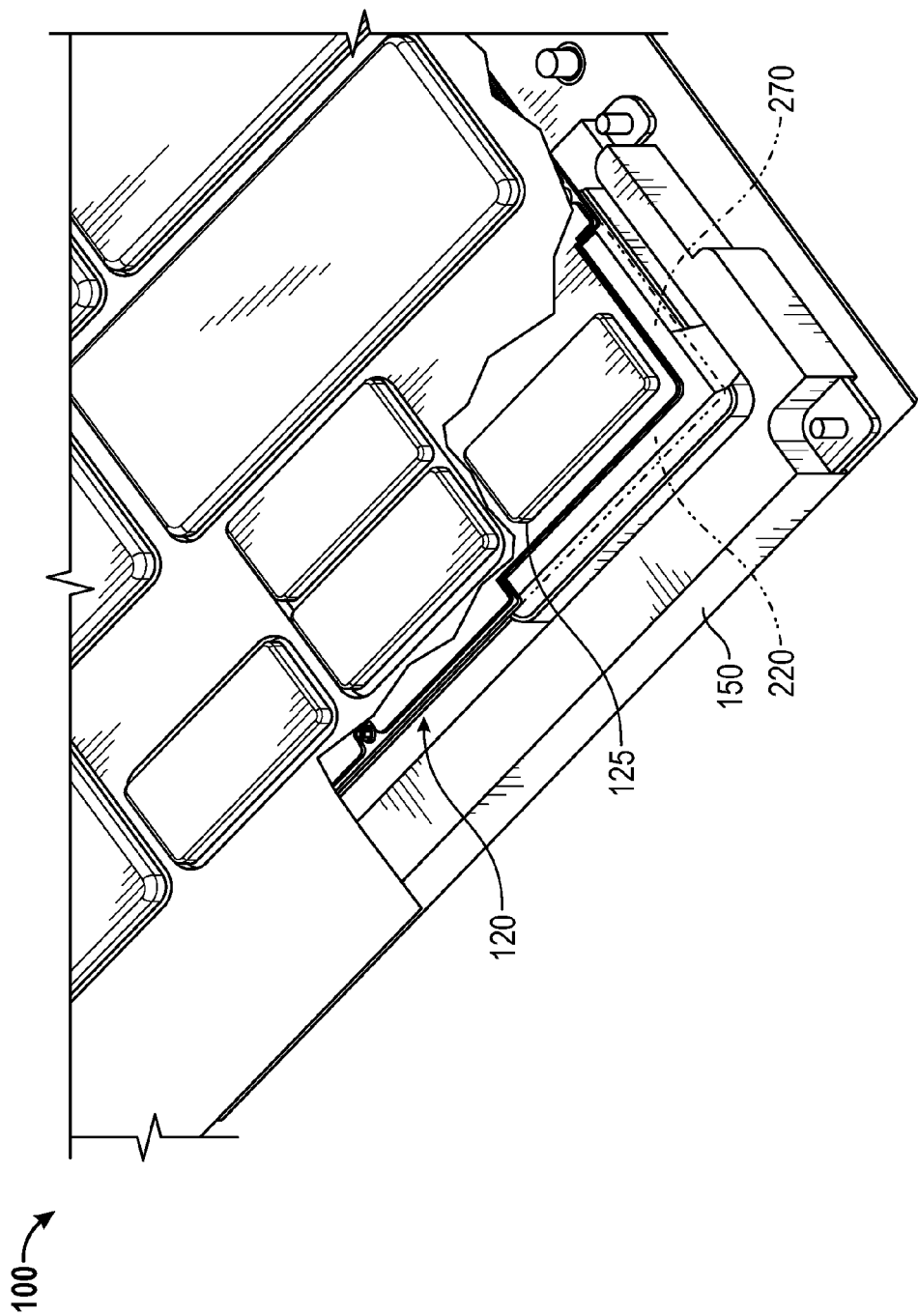
FIG. 3 is an isometric view of an example system for porting a speaker through a keyboard module and a backlight module.

FIG. 3 illustrates an isometric view of the enclosure 110, keyboard module 120, backlight module 130, and speaker 150. In some aspects, the first portion of the port path 230 may further include a cutout 220 (illustrated as an area surrounded by a phantom line) disposed on an edge of the keyboard module 120 and the backlight module 130. The cutout 220 may be formed by removing material from the keyboard module 120 and the backlight module 130. The cutout 220 may be configured to further facilitate transmission of the sound waves generated by the speaker 150 to the user by providing a clearance between the enclosure 110 and the keyboard module 120 and the backlight module 130. For example, the cutout 220 may be configured to align with the passage 210 such that sound waves may travel through the passage 210 to the user without obstruction from the keyboard module 120 or the backlight module 130. By disposing the cutout 220 adjacent to the edge of the keyboard module 120 and backlight module 130, the speaker 150 may be ported through the keyboard module 120 and backlight module 130 without requiring visible holes or grills on the outer surface of the device and without substantially reducing the illumination of the backlight module 130.

The first portion of the port path 230 may further include a second cutout 270 (illustrated as an area surrounded by a phantom line) disposed on a second edge of the keyboard module 120 and the backlight module 130. The second cutout 270 may be formed by removing material from the keyboard module 120 and the backlight module 130. The second cutout 270 may be configured to further facilitate transmission of the sound waves generated by the speaker 150 to the user by providing a clearance between the enclosure 110 and the keyboard module 120 and the backlight module 130. For example, the second cutout 270 may be configured to align with the second passage 260 such that sound waves may travel through the second passage 260 to the user without obstruction from the keyboard module 120 or the backlight module 130. By disposing the second cutout 270 adjacent to the second edge of the keyboard module 120 and backlight module 130, the speaker 150 may be ported through the keyboard module 120 and backlight module 130 without requiring visible holes or grills on the outer surface of the device and without substantially reducing the illumination of the backlight module 130.

In one aspect of the subject technology, the second portion of the port path 230 may extend from the passage 210 and/or the second passage 260 in the enclosure 110 to the periphery of one or more keys 125 of the keyboard module 120. Referring to FIG. 2, after the sound waves travel through the passage 210 and/or the second passage 260 in the enclosure 110, the sound waves may travel to the user via the gap 122 formed between the enclosure 110 and the periphery of the key 125 (denoted as port path 230 in FIG. 2). The gap 122 therefore facilitates transmission of sound waves generated by the speaker 150 to the user.

Figure 4:
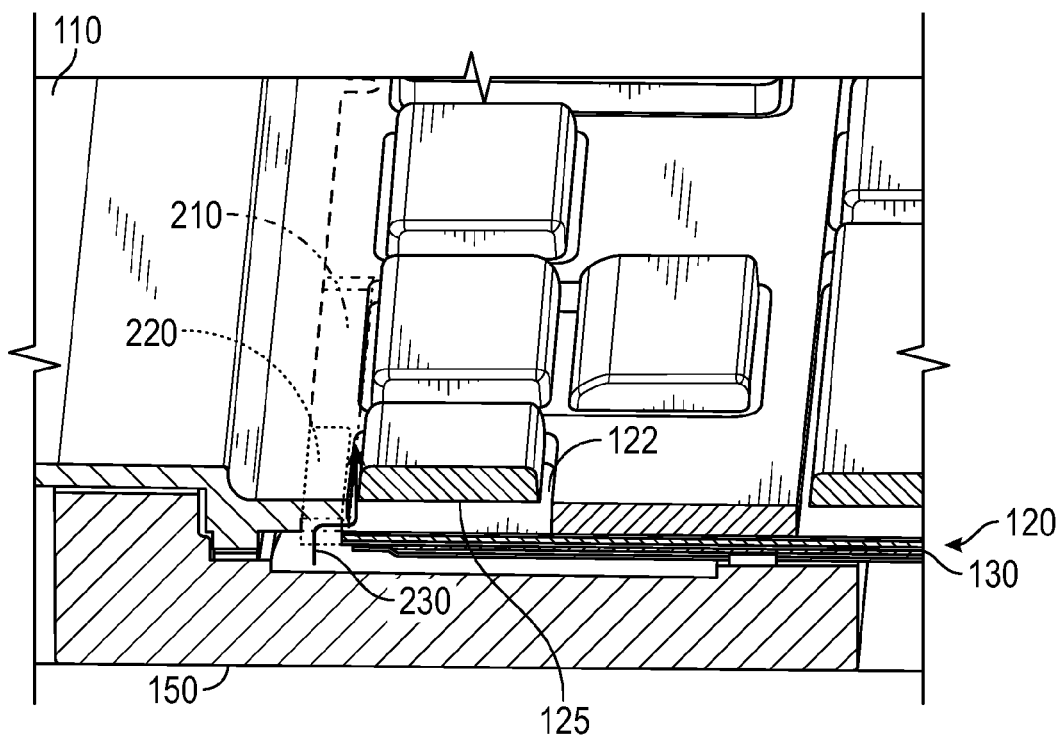
FIG. 4 is a perspective cross section view of an example system for porting a speaker through a keyboard module and a backlight module.

FIG. 4 is a perspective cross section view of the system 100 for porting the speaker 150 through the keyboard module 120 and the backlight module 130. FIG. 4, illustrates the interface between the enclosure 110, the speaker 150, passage 210, cutout 220, key 125, and port path 230. As shown in FIG. 4, sound waves generated by the speaker 150 may follow the port path 230 and travel from the speaker 150 towards the underside of the enclosure 110 into the passage 210, disposed adjacent to the edge of the keyboard module 120 and the backlight module 130. The cutout 220 in the keyboard module 120 and the backlight module 130 may provide a clearance for the sound wave to travel from the edge of the keyboard module 120 and the backlight module 130 to the periphery of the key 125. The sound wave may then travel to the user through the gap 122 formed between the enclosure 110 and the key 125. By disposing the port path 230 adjacent to the edge of the keyboard module 120 and the backlight module 130, porting of the speaker 150 is provided through the backlit keyboard without requiring holes in the backlight module 130. Accordingly, the port path 230 provides porting of the speaker 150 without requiring visible holes or grills on the outer surface of the device and without substantially reducing the illumination of the backlight module 130.

Figure 6:
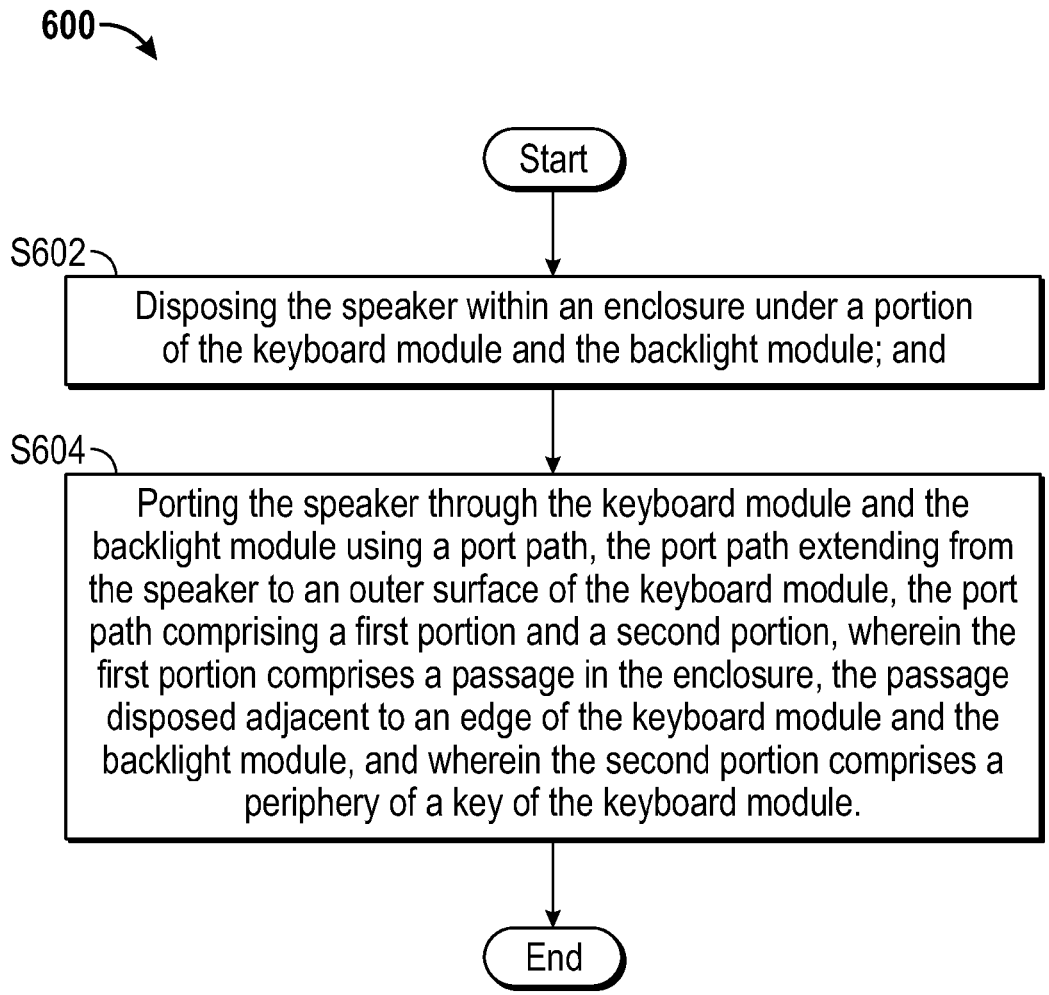
FIG. 6 illustrates an example of a method for porting a speaker through a keyboard module and a backlight module.

FIG. 6 illustrates an example of a method 600 for porting a speaker through a keyboard module and a backlight module, in accordance with various aspects of the subject technology. Method 600 comprises disposing the speaker within an enclosure under a portion of the keyboard module and the backlight module (S602). The method also comprises porting the speaker through the keyboard module and the backlight module using a port path, the port path extending from the speaker to an outer surface of the keyboard module, the port path comprising a first portion and a second portion. The first portion comprises a passage in the enclosure, the passage disposed adjacent to an edge of the keyboard module and the backlight module. The second portion comprises a periphery of a key of the keyboard module (S604).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "upper," "bottom," "lower," "right," "left," "up," "down," "forward," "backward," and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A system for porting a speaker through a keyboard module and a backlight module, the system comprising:
   an enclosure, the enclosure configured to mount the keyboard module, the backlight module, and the speaker thereto, wherein the speaker is disposed under a portion of the keyboard module and the backlight module; and
   a port path for porting the speaker through the keyboard module and the backlight module, the port path extending from the speaker to an outer surface of the keyboard module, the port path comprising a passage adjacent to an edge of the keyboard module and the backlight module.

2. The system of claim 1, wherein the passage is formed at least partially by the enclosure.

3. The system of claim 2, wherein the port path comprises a first portion and a second portion, the first portion corresponding to the passage, and the second portion comprising a periphery of a key in the keyboard module.

4. The system of claim 3, wherein the first portion of the port path further comprises a cutout on the keyboard module and the backlight module, the cutout disposed adjacent to the passage.

5. The system of claim 3, wherein the first portion of the port path comprises a first and a second passage in the enclosure.

6. The system of claim 5, wherein the first passage is disposed adjacent to a first edge of the keyboard module and the backlight module, and the second passage is disposed adjacent to a second edge of the keyboard module and the backlight module.

7. The system of claim 5, wherein the first and the second passage comprise an area of the enclosure having a reduced thickness.

8. The system of claim 5, wherein the first portion of the port path further comprises a first and a second cutout on the keyboard module and the backlight module.

9. The system of claim 8, wherein the first cutout is disposed adjacent to the first passage and the second cutout is disposed adjacent to the second passage.

10. The system of claim 3, wherein the second portion of the port path comprises a periphery of at least two keys of the keyboard module.

11. The system of claim 3, wherein the second portion of the port path further comprises a gap formed between the enclosure and the key.

12. A method for porting a speaker through a keyboard module and a backlight module, the method comprising:
    disposing the speaker within an enclosure under a portion of the keyboard module and the backlight module; and
    porting the speaker through the keyboard module and the backlight module using a port path, the port path extending from the speaker to an outer surface of the keyboard module, the port path comprising a first portion and a second portion, wherein the first portion comprises a passage adjacent to an edge of the keyboard module and the backlight module, and wherein the second portion comprises a periphery of a key of the keyboard module.

13. The method of claim 12, wherein the passage comprises an area of the enclosure having a reduced thickness.

14. The method of claim 12, wherein the first portion further comprises a cutout on the keyboard module and the backlight module.

15. The method of claim 14, wherein the cutout is disposed adjacent to the passage.

16. The method of claim 12, wherein the first portion comprises a first and a second passage in the enclosure.

17. The method of claim 16, wherein the first passage is disposed adjacent to a first edge of the keyboard module and the backlight module, and the second passage is disposed adjacent to a second edge of the keyboard module and the backlight module.

18. The method of claim 16, wherein the first and the second passage comprise an area of the enclosure having a reduced thickness.

19. The method of claim 16, wherein the first portion further comprises a first and a second cutout on the keyboard module and the backlight module.

20. A system for porting a speaker through a keyboard module and a backlight module, the system comprising:
    an enclosure, the enclosure configured to mount the keyboard module, the backlight module, and the speaker thereto, wherein the speaker is disposed under a portion of the keyboard module and the backlight module; and
    a port path for porting the speaker through the keyboard module and the backlight module, wherein the port path extends from the speaker to an outer surface of the keyboard module, is adjacent to an edge of the keyboard module and the backlight module, and comprises a periphery of a key of the keyboard module.

* * * * *